United States Patent [19]

Jacks

[11] 4,199,072
[45] Apr. 22, 1980

[54] DETACHABLE STREET LIGHT BASE TERMINAL CABINET

[76] Inventor: Kenneth R. Jacks, 2117 Ruby, Irving, Tex. 75060

[21] Appl. No.: 30,485

[22] Filed: Apr. 16, 1979

Related U.S. Application Data

[63] Continuation of Ser. No. 872,577, Jan. 26, 1978, abandoned.

[51] Int. Cl.² ............................................. H02G 3/08
[52] U.S. Cl. ..................................... 220/3.4; 220/3.8; 220/3.94; 220/18; 220/338; 220/340; 248/507
[58] Field of Search ................... 220/3.3, 3.4, 3.5, 3.8, 220/3.9, 18, 340, 3.94, 3.9, 3.92, 337, 338, 340; 248/25, 507, 500

[56] References Cited

U.S. PATENT DOCUMENTS

| | | | |
|---|---|---|---|
| 1,229,576 | 6/1917 | Boyton et al. | 220/3.4 |
| 2,299,676 | 10/1942 | Austin, Jr. | 220/3.9 |
| 2,559,009 | 7/1951 | Coyle et al. | 220/340 |
| 2,656,948 | 10/1953 | McGee | 220/3.8 |
| 2,782,045 | 2/1957 | Hulbert | 248/507 X |
| 3,325,127 | 6/1967 | Doskocil | 248/507 X |
| 3,787,024 | 1/1974 | Dzus, Jr. | 248/507 X |

FOREIGN PATENT DOCUMENTS 1424744 12/1965 France ..................................... 248/507

*Primary Examiner*—Joseph Man-Fu Moy
*Attorney, Agent, or Firm*—Gerald G. Crutsinger; John F. Booth; Harry C. Post, III

[57] ABSTRACT

A cabinet having an opening in the bottom thereof through which electrical conductors are extendible from a street light base, the cabinet having a cover detachably secured thereto which is lockable in place. The cabinet is secured over the base of the street light which are of various shapes and sizes by bolts extending upwardly from the base through a plurality of clamp bars. The clamp bars are adapted to adjustably fit over the existing bolts of the street light base and extend over a lip formed in the bottom of the cabinet to secure same to the base over the wires. The wires are connected together and a cover is locked in place over the wires to prevent shock from the electrical current.

5 Claims, 3 Drawing Figures

DETACHABLE STREET LIGHT BASE TERMINAL CABINET

This is a continuation of application Ser. No. 872,577, filed Jan. 26, 1978, now abandoned.

BACKGROUND

Street lights generally have a flange formed on the lower end thereof which is connected to bolts secured in a concrete base or slab. An underground cable generally extends from a transformer through an underground conduit and extends up through the concrete base between the bolts. The cable extends to several light posts and is connected in series to the lights throughout the circuit.

When one light post is damaged, for example when broken by a vehicle, the entire circuit must be turned off at the transformer until the damaged post is replaced.

Depending upon the location of the street lights the posts are generally installed by individual developers in private development areas and by city, state and Federal agencies on larger streets and highways. There are no standard shapes or sizes for the street lights which have three to five bolts to secure the base to a concrete slab or base. Because of the various sizes and geometric shapes of the base of the street lights which may be specified in a given location, it is impractical to keep a large stock of light posts on hand and it is often necessary to order the light post from the manufacturer which oftens causes a two to three month delay in repairing the street light.

Meanwhile, a street light which was lighted is darkened, subjecting the neighborhood to various criminal mischief and causing hazardous driving conditions. When passing from a lighted area to the unlighted area which is caused by the damaged light, the eyes do not have sufficient time to adjust to the darkened area and accidents often occur in these areas of varying light.

Furthermore, due to energy conservation, the amount of street lights once used in some areas are being reduced such that every other one is being disabled. In order to efficiently utilize the light posts not being used, the post is often removed and used in another area of new development. It is necessary to cover the wires extending from the once used light. The wires cannot be placed in the conduit below the ground because water would collect in the conduit and create a short between the conductors since water-tight connections are difficult to make.

Since the wires extend upwardly out of the concrete, once the post has been removed the conductor can not be spliced together and taped in an exposed manner because of the dangerously high voltage used in the street lighting. Children often have a tendency to play with items of which they are not familiar and may be subjected to hazardous shock if the wires are left open. Furthermore, weather conditions create a hazardous condition which could cause an electrical shock to a passerby under wet weather conditions.

Therefore, it is desirable to have a cover which could be utilized over the various shapes of bases and bolt arrangements which would allow splicing of the wires within the circuit and yet cover them in a manner which would render them safe from persons in the area and allow utilization of the remaining street lights in the circuit. Enclosure devices heretofore known have generally been of a specific shape to use on a specific device.

SUMMARY

I have devised a cabinet detachably connectable to the bolts secured in a concrete base or slab generally adapted for holding a light post in place. The cabinet has a detachable cover which may be locked in place. The cabinet has an opening in the bottom through which the electrical conductors may pass so that they may be spliced and insulators placed temporarily thereon until a new light post may be secured for placement over that location.

The cabinet generally comprises a lower enclosure having a passage formed through the bottom such that a lip is formed around the exterior edges of the bottom on the interior of the lower enclosure. The cabinet base is positioned over the area previously occupied by the streat light such that the bolts are centered through the opening in the bottom of the cabinet and the electrical conductors extend therethrough. Clamp bars are positioned over the existing bolts and extend over the lip formed by the bottom of the lower enclosure. Nuts are secured over the existing bolts to tighten down the clamp bars to secure the lower enclosure. The clamp bars are readily adjustable to be moved in any angle such that they will extend over the lip, therefore, accommodating any existing bolt arrangement being used whether three bolts, four bolts, or five bolts are being used.

A cover is secured over the lower enclosure such that the lower enclosure is inexcessible from the outside thereby preventing anyone from sticking a loose wire into the enclosure. The enclosure is preferably locked by a pad lock secured to one end of the cabinet.

The primary object of the invention is to provide a cabinet which is readily adaptable to fit over various existing bolt arrangements used in securing street lights to a concrete base or slab, such that electrical conductors extending up to the street light may be spliced together and covered to prevent shock hazard.

A still further object of the invention is to provide a cabinet which temporarily covers the exposed street light wiring such that the rest of the lights may be used which are in the circuit.

A still further object of the invention is to provide a cabinet which is durable and easy to use which provides an inexcessible enclosure over the bolts and wires to prevent further hazards to the public.

Other and further objects of the invention will become apparent upon a detailed study of the enclosed specification and drawings annexed hereto.

BRIEF DESCRIPTION OF THE DRAWINGS

Drawings of a preferred embodiment of the invention are annexed hereto so that the invention may be better and more fully understood, in which.

Numeral references are used to designate like parts throughout the various figures of the drawings.

DESCRIPTION OF A PREFERRED EMBODIMENT

Figure 1:
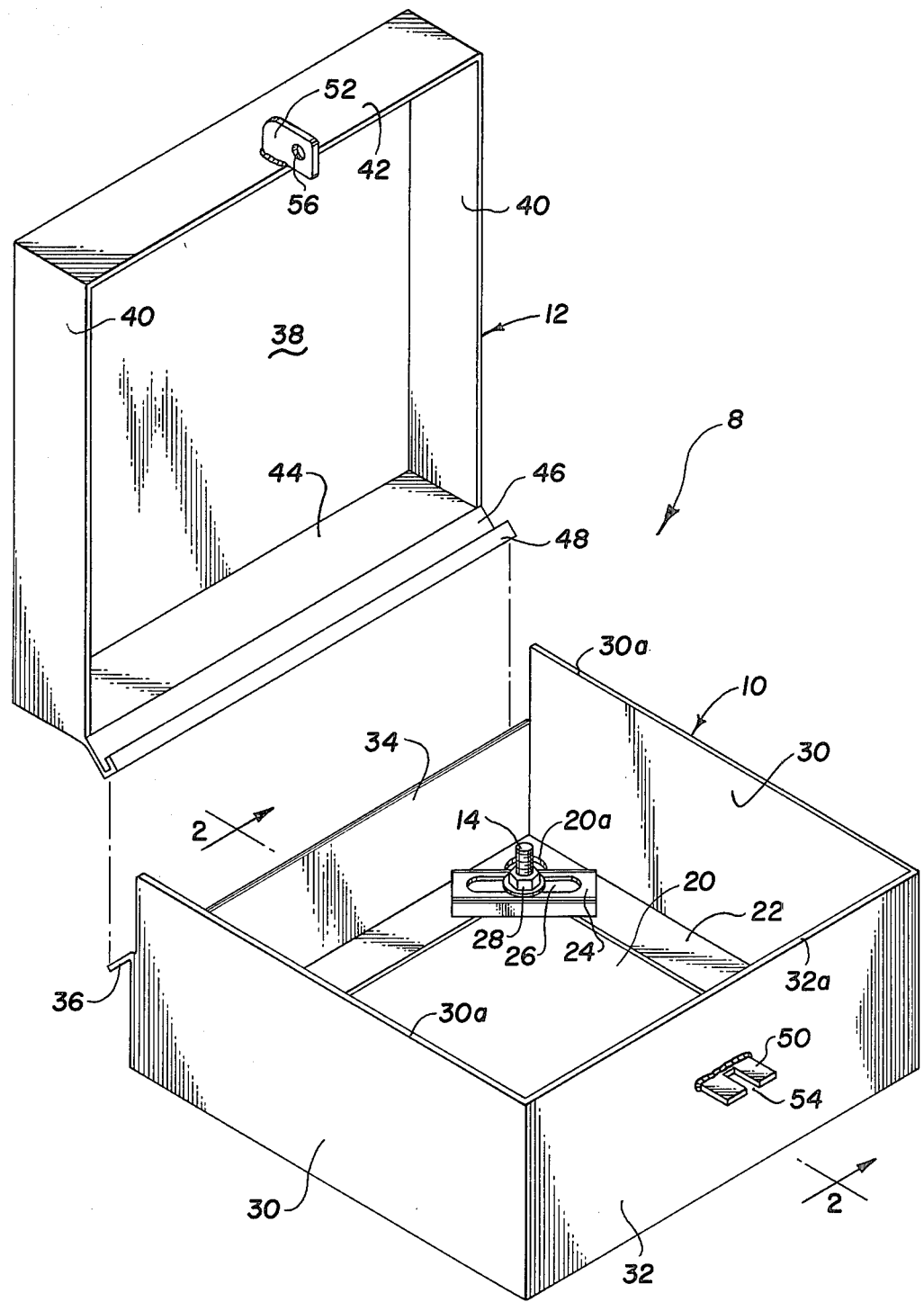
FIG. 1 is an exploded perspective view of the detachable cabinet and cover detached from a base.

Referring to the drawings the cabinet 8 generally comprises a lower enclosure 10 and cover generally designated 12.

Figure 3:
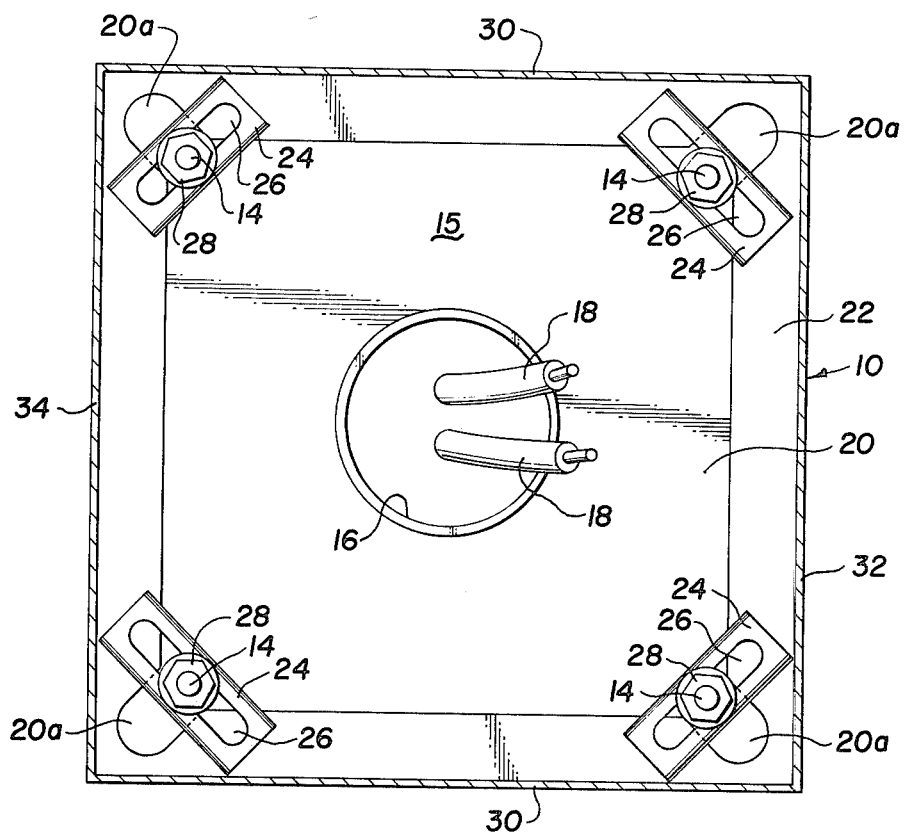
FIG.3 is a plan cross-sectional view taken along line 3—3 of FIG. 2.

As illustrated in FIG. 3, the lower enclosure 10 is positioned over existing bolts 14 from a street light post base 15. A conduit 16 having electrical conductors 18 secured therein is generally centered between bolts 14 and provides the electrical power to the street lamp normally attached to base 15.

The lower enclosure 10 of cabinet 8 has a passage 20 formed therein to allow passage of the electrical conduit 16 into cabinet 8. The bottom of lower enclosure 10 forms a flange or lip 22 around the perimeter of the lower enclosure 10. The passage 20 should be large enough to accommodate various existing configurations of existing bolts 14 such that the bolts 14 fit inside the opening 20 or any of the U-shaped corner openings 20a.

Clamp bars 24 composed of C-shaped channel have oblong passages 26 formed therein and disposed over existing bolts 14 and lip 22 forming the bottom of the enclosure member 10. Nuts 28 are then positioned over clamp bars 24 onto existing bolts 14 such that the clamp bars 24 are secured over the lip 22 to prevent movement of the lower enclosure off of base 15 to which the existing bolts 14 are secured.

Sides 30 extend upwardly and are secured to front wall 32 of lower enclosure 10 to support the cover 12. The rear wall 34 has a deflected flange 36 formed at a lower level than the upper edges 30a and 32a of sidewalls 30 and the front walls 32.

Figure 2:
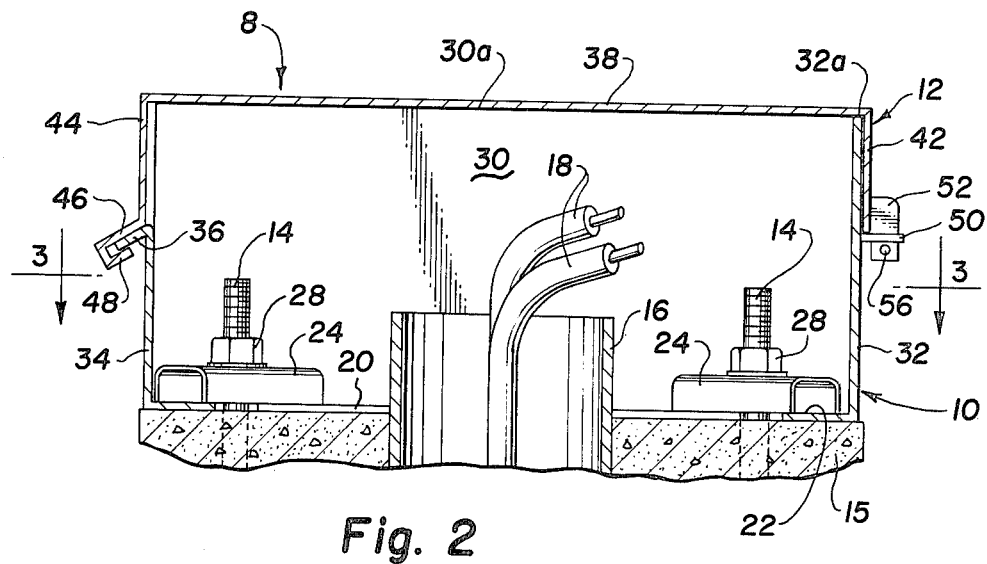
FIG. 2 is a cross-sectional view taken along line 2—2 of FIG. 1.

The cover 12 comprises a top 38 having downwardly deflected sides 40 connected by a downwardly deflected front side 42 and a rear side 44. Means to detachably secure the cover 12 to the lower enclosure 10 comprises a deflected flange 46 secured along the lower edge of rear side 44 of cover 12 having an L-shaped flange 48 formed thereon to engage the lower surface of deflected flange 36 on rear wall 34 of lower enclosure 10. This allows pivotal movement of cover 12 from the rear wall 34 of lower enclosure 10. The sides 40 extend downwardly over sides 30 of lower enclosure 10 and cover 12 is in place as illustrated in FIG. 2. The front 42 of cover 12 extends downwardly over the front wall 32 of lower enclosure 10 thereby rendering the lower enclosure 10 inexcessible from all sides to be penetrated by a wire or other device.

Means to secure the cover 12 in place may comprise a U-shaped lug 50 welded or otherwise secured to front wall 32 of lower enclosure 10. A second lug 52 is secured to the central portion of front side 42 of cover 12 and adapted to extend into the slot 54 formed in lug 50. A hole 56 formed in lug 52 allows a pad lock or other means to be secured thereto to prevent lug 52 from moving out of slot 54 and lug 50 and the cover 12 from being raised off of lower enclosure 10.

It should be readily apparent that edges 30a and 32a extend up and support top 38 of cover 12.

It should be readily apparent that the device may be positioned over any configuration of existing bolts 14. Clamp bars 24 may be positioned such that oblong slot 26 passes over the existing bolts 14 and the edge of the clamp bars 24 extends over lip 22 of lower enclosure 10. The nuts 28 are secured down to tighten clamp bars 24 in place to secure the lower enclosure 10 to a position on the concrete base 15 where the light post previously occupied. Electrical conductors 18 may be spliced to complete the circuit previously opened by the damaged light post or a light post which had to be removed for other reasons. Once spliced and covered with an electrical insulator, the upper cover 12 is positioned such that the L-shaped flange 48 extends over flange 36 and a cover 12 is moved downwardly such that lug 52 moves through slot 54 on lug 50.

It should be appreciated that front wall 32 of lower enclosure 10 is spaced from the front side 42 of cover 12 and flange 48 is spaced from flange 36 to allow front side 42 to move past side 32.

Once the wires 18 have been spliced, the circuit may be re-energized at the transformer to allow utilization of the remaining lights within the circuit.

A pad lock or other device may be positioned to aperture 56 to lock cabinet 8 in position until such time that the light post may be replaced on a permanent basis. By reversing the steps the cover may be detached from the base 15 to allow removal for positioning the light post in place and connecting the light into the circuit.

It should be appreciated that the cabinet 8 may be shaped in other geometric configurations such as cylindrical.

Having described my invention, I claim:

1. A terminal cabinet for temporarily enclosing exposed electrical conductors on a street light base, the street light base having at least three upwardly extending bolts used to secure the light post thereto, the improvement comprising: a base having upwardly extending sides, each side of said base having an inwardly extending flange formed about the interior perimeter of the sides such that a central passage is formed through the bottom of the base the base further being positioned such that the electrical conductors and bolts extend upwardly through said passage; a solid cover having downwardly deflected sides extending downwardly over the upper portion of the sides of the base; means detachably securing the cover to the base; means to lock said cover to the base; clamp bars having a bolt receiving passage formed therein to be secured over the bolts on the street light base and over a portion of the flange on the inside of the base; and means secured to said bolts for urging the clamp bars against the flange of the base to secure the base to the street light base.

2. The combination called for in claim 1 wherein said clamp bars comprise: C-shaped channels having an oblong slot formed therein adapted to adjustably fit over the bolts and a portion of the bottom.

3. A terminal cabinet for temporarily enclosing electrical conductors extending outwardly from a street light base, the street light base having a plurality of outwardly extending bolts for securing the street light post thereto, the improvement comprising: a lower cabinet portion having upwardly extending sides; an inwardly extending flange formed about the interior perimeter of the lower portion of the sides of said lower cabinet portion; a cover having downwardly deflected sides slideably disposed over said sides of said lower cabinet portion; means detachably securing said cover over said lower cabinet portion; means to lock said cover to said lower cabinet portion; clamp bars having an elongated bolt receiving passage formed therein to receive said outwardly extending bolts of said street light base such that the clamp bar may be moved over the bolt and simultaneously over a portion of said flange; and a nut secured to said bolt urging said clamp bar against said flange of said lower cabinet portion to secure said lower cabinet portion to said street light base.

4. A terminal cabinet for temporarily enclosing electrical conductors extending outwardly from a street light base, the street light base having a plurality of outwardly extending bolts for securing the street light post thereto, the improvement comprising: a lower cabinet portion having three sides of substantially equal height and a fourth side of lower height, said fourth side having a deflected flange extending outwardly and downwardly therefrom; an inwardly extending flange formed about the interior perimeter of the lower portion of the sides of said lower cabinet portion; a cover having downwardly deflected sides adapted to be slideably disposed over said sides of said lower cabinet portion, one of said sides of said cover having a downwardly deflected flange having an L-shaped flange formed on the lower edge thereof to form a pocket which is slideably disposed over the lower edge of said deflected flange on said fourth side of said lower cabinet portion; means to lock said cover to said lower cabinet portion; clamp bars having an elongated slot formed therein adapted to receive said outwardly extending bolts of said street light base such that the clamp bar may be moved over the bolt and simultaneously over an edge of said flange; and a nut secured to said bolt adapted to urge said clamp bar against said flange of said lower cabinet portion to secure said lower cabinet portion to said street light base.

5. A terminal cabinet according to claim 4, wherein said flange has a U-shaped slot formed in each of the corners to receive an outwardly extending bolt of said street light base.

* * * * *